United States Patent
Kim et al.

(10) Patent No.: US 7,203,240 B2
(45) Date of Patent: Apr. 10, 2007

(54) METHOD OF RECOVERING CLOCK SIGNAL USING USER CLOCK CODE IN TDM DIGITAL VIDEO SIGNAL AND TRANSMITTING/RECEIVING APPARATUS USED FOR THE METHOD

(75) Inventors: Chan-Yul Kim, Puchon-shi (KR); Jun-Ho Koh, Suwon-shi (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 760 days.

(21) Appl. No.: 10/651,745

(22) Filed: Aug. 29, 2003

(65) Prior Publication Data

US 2004/0228407 A1 Nov. 18, 2004

(30) Foreign Application Priority Data

May 16, 2003 (KR) ............... 10-2003-0031166

(51) Int. Cl.
  *H04N 7/12* (2006.01)
  *H04B 7/212* (2006.01)
(52) U.S. Cl. .................. 375/240.28; 370/347
(58) Field of Classification Search ........... 375/240.28, 375/361, 295; 370/362, 347, 485, 545, 321
See application file for complete search history.

(56) References Cited

U.S. PATENT DOCUMENTS

| | | | | |
|---|---|---|---|---|
| 4,855,996 A | * | 8/1989 | Douskalis | ............ 370/545 |
| 4,885,741 A | * | 12/1989 | Douskalis | ............ 370/362 |
| 5,696,800 A | * | 12/1997 | Berger | ............ 375/361 |
| 5,886,989 A | * | 3/1999 | Evans et al. | ............ 370/347 |
| 6,937,617 B2 | * | 8/2005 | Rakib et al. | ............ 370/485 |
| 2002/0122498 A1 | | 9/2002 | Dogan | |
| 2002/0181608 A1 | * | 12/2002 | Kim et al. | ............ 375/295 |
| 2003/0058890 A1 | | 3/2003 | Ritchie, Jr. et al. | |

FOREIGN PATENT DOCUMENTS

| | | |
|---|---|---|
| JP | 06-030066 | 2/1994 |
| JP | 09-046321 | 2/1997 |

\* cited by examiner

*Primary Examiner*—Gims Philippe
(74) *Attorney, Agent, or Firm*—Cha & Reiter, L.L.C.

(57) ABSTRACT

A clock recovery method for a TDM digital video signal and a transmitting/receiving apparatus for the clock recovery method are disclosed. A transmitter inserts a user clock code containing a predetermined number of points into the digital video signal during TDM processing and transmits the digital video signal. A receiver receives the TDM digital video signal and detects the user clock code from the TDM digital video signal. It counts a reference clock signal and recovers a transmission clock signal in an LMS algorithm using the user clock code and the count value.

9 Claims, 3 Drawing Sheets

METHOD OF RECOVERING CLOCK SIGNAL USING USER CLOCK CODE IN TDM DIGITAL VIDEO SIGNAL AND TRANSMITTING/RECEIVING APPARATUS USED FOR THE METHOD

CLAIM OF PRIORITY

This application claims priority under 35 U.S.C. § 119 to an application entitled "Method of Recovering Clock Signal Using User Clock Code in TDM Digital Video Signal and Transmitting/Receiving Apparatus Used for the Method," filed in the Korean Intellectual Property Office on May 16, 2003 and assigned Ser. No. 2003-31166, the contents of which are herein incorporated by reference.

BACKGROUND OF THE INVENTION

1. Field of the Invention

The present invention relates generally to digital video processing, and in particular, to a method of synchronizing a digital video signal when it is transmitted or received.

2. Description of the Related Art

In conventional digital data systems, data is transmitted/received in the form of a binary digital signal including an unmodulated clock signal. However, a timing skew may be created between the transmission and reception of the digital signal. Therefore, the digital data system must be able to recover data accurately by overcoming the timing skew. For this purpose, a clock recovery circuit is adopted and a PLL (Phase Locked Loop) is widely used for clock recovery.

The PLL is a circuit that automatically adjusts the phase of a locally generated signal to the phase of an input signal. The PLL controls an oscillator or a periodic signal generator so that it maintains a constant phase angle relative to a reference signal. It is used for coherent demodulation of digital modulated signals, coherent carrier tracking, threshold extension, bit synchronization, and symbol synchronization. Phase synchronization is implemented by an elastic store (ES) which is capable of independent input and output and absorbs the phase jitter of an input signal induced by delay variations and distortion on a transmission line, resulting in framing phase synchronization at a particular time point.

FIG. 1 is a block diagram of a typical PLL. The PLL is includes a phase/frequency detector 11, a loop filter 12, and a voltage controlled oscillator (VCO) 13. Clock extraction from the input data in the typical PLL will be described below with reference to FIG. 1.

Referring to FIG. 1, upon input of external data, the phase/frequency detector 11 extracts the clock component of the data, compares its phase with the phase of a signal received from the VCO 13, and provides the phase difference to the loop filter 12. The loop filter 12 filters the error signal received from the phase/frequency detector 11 and compensates a feedback loop so that the VCO 13 outputs a precisely phase-synchronized clock signal.

However, many networks encompass a myriad of data rates so that the general PLL in such networks is problematic. In order to recover data transmitted at such varying data rates, it is critical to recover a clock at each data rate. Therefore, in order to use a conventional PLL in a network encompassing a wide range of data rates, a plurality of PLL circuits that are respectively tuned to different data rates must be provided.

In this regard, the variable data rate situation, the clock recovery circuit configuration request a plurality of different VCOs (analog devices), resulting in increased complexity. Setting points are under analog control and thus they are sensitive, which makes precise phase synchronization challenging. Moreover, the clock recovery circuit is very difficult to implement except with use of a clock extracting device for existing data rates.

It is necessary to extract clock signals at different data rates in a broadcasting and communication environment. For example, digital video data is transferred at a data rate of 270 Mbps in DVB-ASI (Digital Video Broadcasting-Asynchronous Serial Interface) and at varying data rates of 10 to 80 Mbps in HDTV (High Definition Television). In the conventional technology involving the PLL, the clock extraction at the variable data rate requires hardware replacement or addition for each different data rate.

Accordingly, there is a need in the art for improved clock recovery mechanisms.

SUMMARY OF THE INVENTION

It is, therefore, one object of the present invention to provide a clock recovery method in which a transmitter inserts a user clock code containing a predetermined number of points prior to data transmission and a receiver recovers a synchronized clock signal using the user clock code and a reference clock signal, and a transmitting/receiving apparatus used for the method.

It is another object of the present invention to provide a clock recovery method in which a transmitter inserts a user clock code containing a predetermined number of points into the overhead of a TDM (Time Division Multiplex) MPEG (Moving Picture Experts Group) TS (Transmission Stream) signal to provide the same functionality as PCR (Peak Cell Rate) of MPEG TS and a receiver obtains a lock range using a maximum likelihood value in an LMS (Least Mean Square) algorithm.

One embodiment of the present invention is directed to a clock recovery method for a TDM digital video signal and a transmitting/receiving apparatus for the clock recovery method.

According to one aspect of the present invention, a transmitter inserts a user clock code containing a predetermined number of points into the digital video signal during TDM processing and transmits the digital video signal. A receiver receives the TDM digital video signal and detects the user clock code from the TDM digital video signal. It counts a reference clock signal and recovers a transmission clock signal in an LMS algorithm using the user clock code and the count value.

According to another aspect of the present invention, in a TDM digital video signal transmitter, a parallel-to-serial converter converts parallel digital video signals to a serial digital video signal, a frame generator forms a TDM frame with the serial digital video signal, a CRC generator generates a CRC to verify the reliability of the serial digital video signal and outputting the CRC to the frame generator, a transmitter transmits the TDM frame, a reference clock generator generates a reference clock signal, and a user clock generator generates a user clock code containing a predetermined number of points using the reference clock signal and provides the user clock code to the frame generator.

According to a further aspect of the present invention, in a TDM digital video signal receiver, a user clock code detector receives a TDM digital video signal and detects a user clock code from the TDM digital video signal, a reference clock generator generates a reference clock signal, a counter counts the reference clock signal, and a clock extractor extracts a synchronized clock signal in an LMS algorithm using the user clock code received from the user clock code detector and the count value received from the counter.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 1:
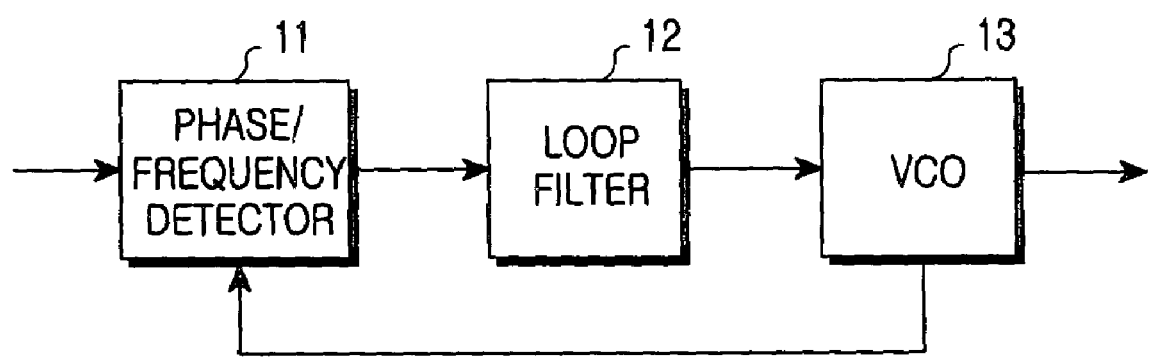
FIG. 1 is a block diagram of a typical PLL.
Figure 2:
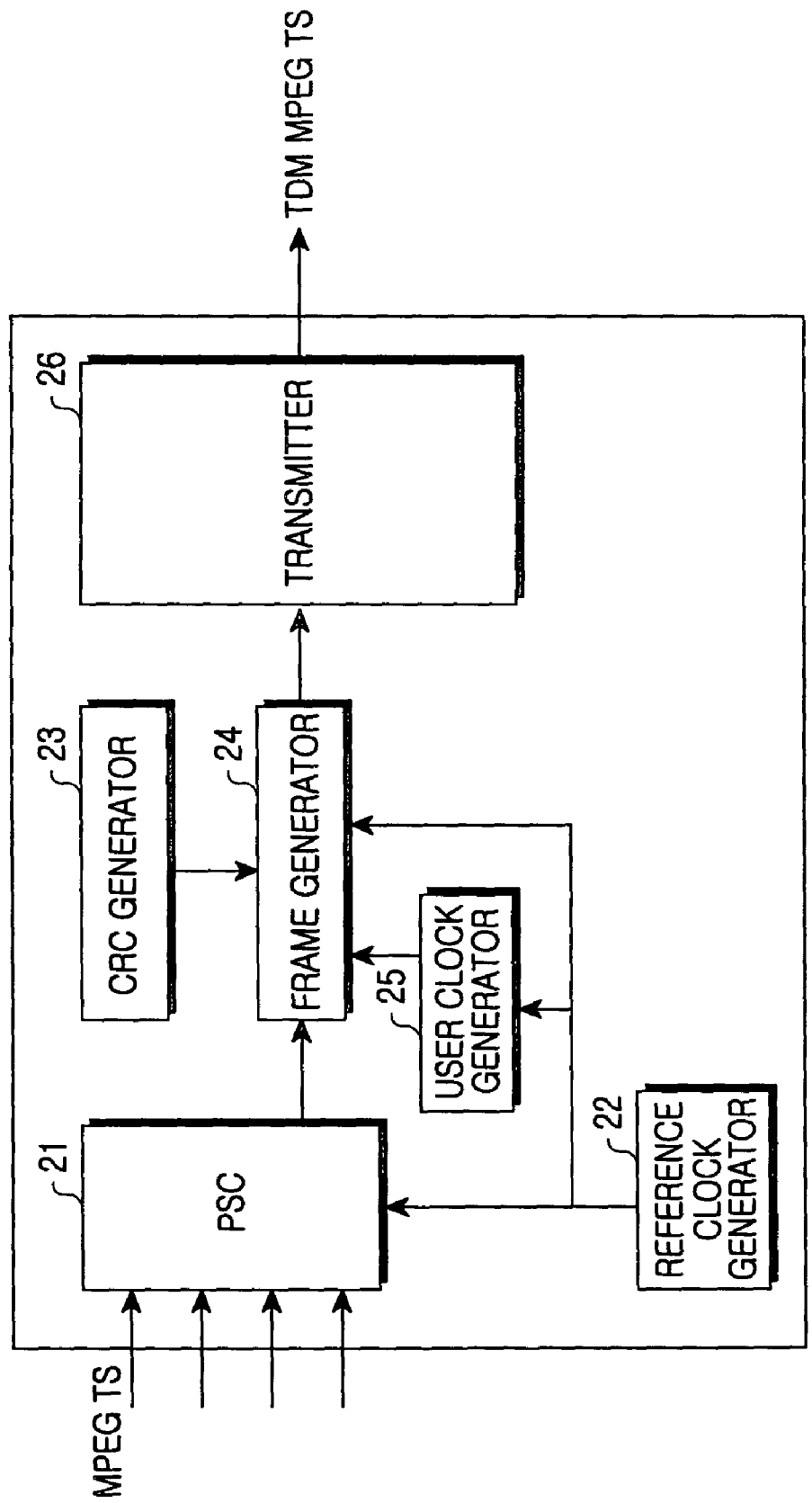
FIG. 2 is a block diagram of an MPEG TS transmitter for inserting a user clock code, for clock recovery according to an embodiment of the present invention.

FIG. 2 is a block diagram of an MPEG TS transmitter for inserting a user code into an MPEG TS signal so that a receiver recovers a clock signal according to an embodiment of the present invention.

Referring to FIG. 2, the MPEG TS transmitter is comprised of a parallel-to-serial converter (PSC) 21 for converting parallel MPEG TS signals to a serial one, a frame generator 24 for forming a TDM frame with the serial MPEG TS signal, a CRC (Cyclic Redundancy Check) generator 23 for verifying the reliability of the serially transmitted data, a transmitter 26 for transmitting the TDM frame, a reference clock generator 22 for generating a reference clock signal for each component, and a user clock generator 25 for generating a user clock signal using the reference clock signal.

In this MPEG TS transmitter, an N-point user clock code is inserted into a TDM MPEG frame. The user clock code is usually positioned after a sync byte in a frame overhead. It is in an alternating zero-one pattern. For an MPEG TS, N is computed in the manner that maintains an about ±3 ppm stability. How to compute N and an exemplary N value will be described later in detail with reference to Eq. (1) to Eq. (16).

N is a ratio of a transmission clock signal to a reference clock signal and creates an overhead of about 500 to 1000 bits. For a typical MPEG TS signal, a transmission clock signal can be recovered by a user clock code inserted into only about 3 or 4 frames in an initial state because data is successive.

Figure 3:
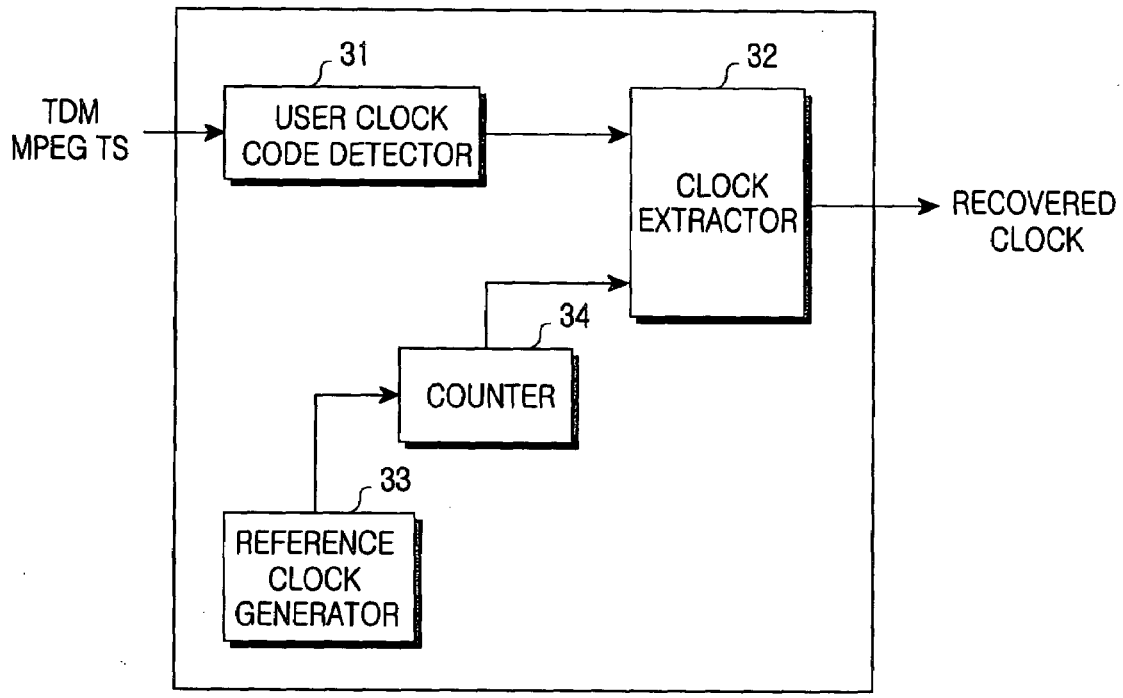
FIG. 3 is a block diagram of a clock recovery device in an MPEG TS receiver according to another embodiment of the present invention.

FIG. 3 is a block diagram of a clock recovery device in an MPEG TS receiver according to an embodiment of the present invention. Referring to FIG. 3, the clock recovery device is comprised of a user clock code detector 31 for extracting a user clock code from a received TDM frame, a reference clock generator 33 for generating a reference clock signal for the MPEG TS receiver, a counter 34 for counting the reference clock signal, and a clock extractor 32 for extracting a synchronized clock signal according to the clock information received from the user clock code detector 31 and the counter 34.

Figure 4:
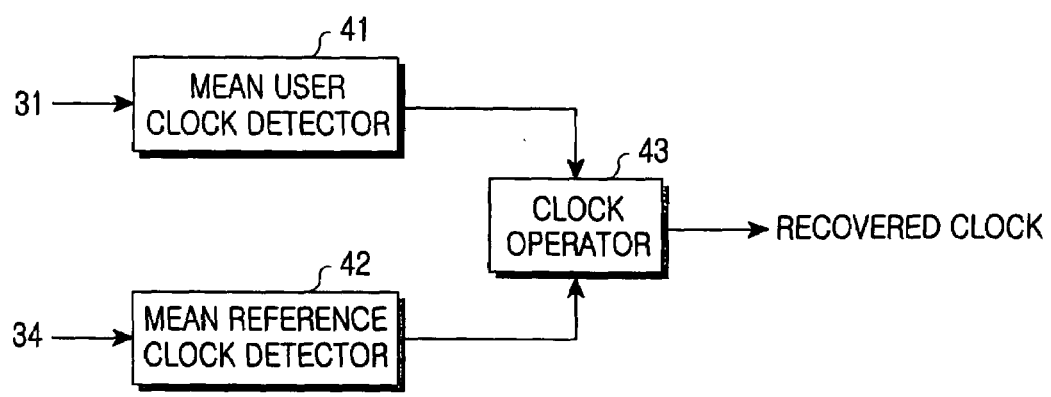
FIG. 4 is a block diagram of a clock extractor in the clock recovery device illustrated in FIG. 4.

The clock extractor 32 is illustrated in more detail in FIG. 4. Referring to FIG. 4, the clock extractor 32 includes a mean user clock detector 41 for detecting a mean user clock code, a mean reference clock detector 42 for detecting a mean reference clock signal from the counter 34, and a clock operator 43 for extracting the synchronized clock signal according to the clock information received from the mean user clock detector 41 and the mean reference clock detector 42.

Now a description will be made below of an LMS algorithm used for clock extraction in the clock operator 43.

A set P of a user clock code $X_i$ from the user clock code detector 31 and a reference clock count value $Y_i$ from the counter 34 is represented by $$P = \{(X_1, Y_1), (X_2, Y_2), \ldots, (X_N, Y_N)\} \quad (1)$$

on which an LMS best fit process results in $$m_n = \frac{(Y - \bar{y})}{(X - \bar{x})} \quad (2)$$

and $$\tilde{b}_n = \bar{Y} - m_n \cdot \bar{X}$$

where $X=(X_1, X_2, \ldots, X_n)$, $Y=(Y_1, Y_2, \ldots, Y_n)$, $\bar{X}=\text{mean}(X)$, $\bar{Y}=\text{mean}(Y)$ $$\bar{x} = (\bar{X}, \bar{X}, \ldots, \bar{X}), \bar{y} = (\bar{Y}, \bar{Y}, \ldots, \bar{Y}) \quad (3)$$

An ideal jitter-free reference clock is represented by X' and a zero-mean noise vector is represented by n so that, $$X = X' + n \quad (4)$$

It is assumed that $b_n$ is zero. This assumption is acceptable considering that a finite value of $b_n$ corresponds to the overall shift of the reference clock signal.

Thus, Eq. (2) is expressed as $$m_n = \frac{X^t \cdot (mX' + \tilde{b}_n - \bar{y})}{X^t \cdot (X - \bar{x})} \quad (5)$$

where $$\tilde{b}_n = (b_n, b_n, \ldots, b_n) = \bar{y} - m\bar{x} \quad (6)$$

By substituting this value in $\tilde{b}_n$ in Eq. (5), $$m_n = \frac{X^t \cdot (mX' + \bar{y} - m\bar{x} - \bar{y} - m\bar{n})}{X^t \cdot (X - \bar{x})} \quad (7)$$

Considering Eq. (4), $$m_n = \frac{mX^t \cdot (X - n - \bar{x} - \bar{n})}{X^t \cdot (X - \bar{x})} \quad (8)$$

where m is a slope when noise is absent. Therefore, Y=mX'+b and $\bar{n}$(mean(n), mean(n), . . . , mean(n)).

If $X^t \cdot (X-\bar{x})$ is represented as $\beta$, Eq. (8) is simplified to $$(m_n - m) = -\frac{mX' \cdot (n-\bar{n})}{\beta} \quad (9)$$

And $$\beta \approx X'' \cdot (X' - \bar{x}) = \sum_{i=t}^{N} X_t' - \sum_{i=t}^{N} X_t' \cdot \bar{X} = \frac{N(N+1)(2N+1)}{6} - \quad (10)$$

$$\frac{N(N+1)N(N+1)}{2 \cdot N \cdot 2} \approx \frac{N^3}{12}$$

$$X^t \cdot (n - \bar{n}) = n_1 X_1 + n_2 X_2 + \ldots + n_N X_N \quad (11)$$

$$std(m_n - m) = \frac{m}{\beta} std(n_1 + 2n_2 + 3n_3 + \ldots + Nn_N - \frac{N(N+1)}{2N}(n_1 + \quad (12)$$

$$n_2 + \ldots + n_N))$$

If $n_i$ is Gaussian and independent, part of Eq. (12) is estimated as $$std(n_1 + 2n_2 + 3n_3 + \ldots + Nn_N - \frac{N(N+1)}{2N}(n_1 + n_2 + \ldots + n_N)) =$$

$$\sqrt{\sigma_c^2 + (2\sigma_c)^2 + \ldots + (N\sigma_c)^2} = \sqrt{\frac{7}{12}} N^{\frac{3}{2}} \sigma_c$$

where $\sigma_c$ is a mean deviation of noise in the reference clock signal and N is assumed to be substantially large. From the viewpoint of Eq. (13), Eq. (12) is expressed as $$std(m_n - m) = \frac{m\sqrt{\frac{7}{12}} N^{\frac{3}{2}} \sigma_c}{\frac{N^3}{12}} = \sqrt{84} \, mN^{\frac{3}{2}} \sigma_c \quad (14)$$

Hence, it is clear that the worst error is generated at the remotest point, and the mean error is determined by $$E = (m_n - m)N \quad (15)$$

$$std(E) = \sqrt{84} \, mN^{\frac{-3}{2}} \sigma_c \cdot N = \sqrt{84} \, mN^{\frac{1}{2}} \sigma_c$$

The above equations are well known as performed to model errors by the LMS best fit process on the received last N points. Here, the number of LMS points required to drop the error deviation within a preset value $\sigma_d$ can be computed easily, as follows:

$$N = \left(\frac{\sqrt{84}\, \sigma_c m}{\sigma_d}\right)^2 = 84\left(\frac{\sigma_c}{\sigma_d}\right)^2 m^2 \quad (16)$$

To design a system having a 200 ns jitter limit from a 27 Mhz reference clock signal with an error of 1 μs, a user clock code needs 2100 points (N=84×(1 μs/200 ns)×1).

While the inventive clock recovery through the above procedure may lengthen a lock time, this is negligible for a video signal because the lock time increase is only about 1 ms or less.

In accordance with aspects of the present invention as described above, a user clock code containing a predetermined number of points is inserted into the overhead of a TDM MPEG TS signal to provide the same functionality as the PCR of MPEG TS, so that a receiver can recover a transmission clock signal precisely and easily with a reduced hardware requirement as compared to the existing PLL circuit.

Furthermore, when a reference clock signal is a program clock reference (controllable by a CPU) in the receiver, the reference clock can be changed simply by software upgrade without hardware modifications. Therefore, the reference clock can be easily set manually in a digital video transmitting/receiving system supporting a variable data rate.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A clock recovery method for a TDM (Time Division Multiplex) digital video signal, comprising the steps of:
    inserting a user clock code containing a predetermined number of points into the digital video signal during TDM processing and transmitting the digital video signal;
    receiving the TDM digital video signal and detecting the user clock code from the TDM digital video signal;
    counting a reference clock signal; and
    recovering a transmission clock signal in an LMS (Least Mean Square) algorithm using the user clock code and the count value.

2. The clock recovery method of claim 1, wherein the number of user clock code points is determined by $$N = \left(\frac{\sqrt{84}\, \sigma_c m}{\sigma_d}\right)^2 = 84\left(\frac{\sigma_c}{\sigma_d}\right)^2 m^2 \quad (17)$$

where N is the number of user clock code points, $\sigma_c$ is the mean deviation of noise in the reference clock signal, $\sigma_d$ is a preset jitter limit, and m is a slope when noise is absent.

3. The clock recovery method of claim 1, wherein the user clock code is positioned after a sync byte in a frame overhead of the TDM digital video signal.

4. The clock recovery method of claim 2, wherein the user clock code is positioned after a sync byte in a frame overhead of the TDM digital video signal.

5. A TDM (Time Division Multiplex) digital video signal transmitter comprising:
    a parallel-to-serial converter arranged to convert parallel digital video signals to a serial digital video signal;
    a frame generator arranged to form a TDM frame with the serial digital video signal;
    a CRC (Cyclic Redundancy Check) generator arranged to generate a CRC to verify the reliability of the serial digital video signal and output the CRC to the frame generator;

a transmitter arranged to transmit the TDM frame;

a reference clock generator arranged to generate a reference clock signal; and a user clock generator arranged to generate a user clock code containing a predetermined number of points using the reference clock signal and providing the user clock code to the frame generator.

6. A TDM (Time Division Multiplex) digital video signal receiver comprising:

a user clock code detector arranged to receive a TDM digital video signal and detect a user clock code from the TDM digital video signal;

a reference clock generator arranged to generate a reference clock signal;

a counter arranged to count the reference clock signal; and a clock extractor arranged to extract a synchronized clock signal in an LMS (Least Mean Square) algorithm using the user clock code received from the user clock code detector and the count value received from the counter.

7. The TDM digital video signal receiver of claim 6, wherein the clock extractor comprises:

a mean user clock detector arranged to detect a mean user clock code using the user clock code received from the user clock code detector;

a mean reference clock detector arranged to detect a mean reference clock signal using the count value received from the counter; and a clock operator arranged to extract the synchronized clock signal in the LMS algorithm using the mean user clock code and the mean reference clock code.

8. A method for recovering a synchronized clock signal in a TDM (Time Division Multiplex) digital video signal receiver, the method comprising the steps of:

receiving a TDM digital video signal;

detecting a user clock code from the TDM digital video signal;

generating a reference clock signal;

counting the reference clock signal; and extracting a synchronized clock signal in an LMS (Least Mean Square) algorithm using the user clock code and the count value.

9. The method of claim 8, wherein the extracting step comprises:

detecting a mean user clock code using the user clock code;

detecting a mean reference clock signal using the count value; and extracting the synchronized clock signal in the LMS algorithm using the mean user clock code and the mean reference clock code.

* * * * *